US012353545B2

(12) United States Patent
Gupta

(10) Patent No.: US 12,353,545 B2
(45) Date of Patent: Jul. 8, 2025

(54) SYSTEM AND METHOD FOR IMPROVING SECURITY USING RECURSIVELY GENERATED QUICK RESPONSE CODES

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 225 days.

(21) Appl. No.: 18/330,159

(22) Filed: Jun. 6, 2023

(65) Prior Publication Data
US 2024/0411870 A1  Dec. 12, 2024

(51) Int. Cl.
*H04L 29/06* (2006.01)
*G06F 21/55* (2013.01)
*G06K 7/14* (2006.01)
*G06K 19/06* (2006.01)

(52) U.S. Cl.
CPC ......... *G06F 21/554* (2013.01); *G06K 7/1417* (2013.01); *G06K 19/06037* (2013.01); *G06F 2221/034* (2013.01)

(58) Field of Classification Search
CPC ............ G06F 21/554; G06F 2221/034; G06K 7/1417; G06K 19/06037
See application file for complete search history.

(56) References Cited

U.S. PATENT DOCUMENTS

| 8,645,270 B2 | 2/2014 | Mallean et al. |
| 9,009,818 B2 | 4/2015 | Tuvell et al. |
| 9,058,607 B2 | 6/2015 | Ganti et al. |
| 9,633,325 B2 | 4/2017 | Bolene et al. |
| 9,811,848 B2 | 11/2017 | Reuss et al. |
| 10,089,606 B2 | 10/2018 | Ihm et al. |
| 10,153,906 B2 | 12/2018 | Sweet et al. |
| 10,163,137 B2 | 12/2018 | Hoffberg |
| 10,402,792 B2 | 9/2019 | Lin et al. |
| 10,762,477 B2 | 9/2020 | Finch et al. |
| 10,970,274 B2 | 4/2021 | Bisbee et al. |
| 11,074,218 B2 | 7/2021 | Faith et al. |
| 11,232,452 B2 | 1/2022 | Ivey et al. |

(Continued)

FOREIGN PATENT DOCUMENTS

WO   WO-2022010369 A1 *  1/2022

*Primary Examiner* — Jeffrey C Pwu
*Assistant Examiner* — Edgar W Xie

(57) ABSTRACT

A method includes capturing a preliminary quick response (QR) code displayed by a device of a desired service provider. The preliminary QR code has a substantially blank region and comprises an identification feature of the desired service provider. The identification feature is analyzed to determine an identification credential of the desired service provider. In response to determining that the identification credential matches a stored identification credential stored in a server of an interaction provider, a QR code is requested from the server. One or more directed acyclic graphs (DAGs) are generated. A first DAG is received from the server. A first portion of the QR code is generated based on the first DAG and added to the preliminary QR code to generate a first intermediate QR code. One or more recursion operations are performed until all DAGs are received and the QR code is generated from the preliminary QR code.

20 Claims, 6 Drawing Sheets

(56) References Cited

U.S. PATENT DOCUMENTS

| | | |
|---|---|---|
| 11,301,554 B2* | 4/2022 | Law .................. G06F 21/34 |
| 2017/0103399 A1 | 4/2017 | Napsky et al. |
| 2020/0167620 A1* | 5/2020 | Lin .................. G06K 19/06037 |
| 2021/0044976 A1* | 2/2021 | Avetisov ............... H04W 12/08 |
| 2022/0217121 A1 | 7/2022 | Devarajan et al. |

* cited by examiner

SYSTEM AND METHOD FOR IMPROVING SECURITY USING RECURSIVELY GENERATED QUICK RESPONSE CODES

TECHNICAL FIELD

The present disclosure relates generally to improving security of computing systems, and more specifically to a system and method for improving security using recursively generated quick response codes.

BACKGROUND

Users may be required to perform interactions before receiving desired services from service providers. The users receive quick response (QR) codes form the service providers to perform the requested interactions. The interactions are usually performed through interaction providers. Malicious users or entities circulate fake QR codes to hijack interactions between the users and the service providers. The fake QR codes may be used to install malware into devices of the users and gain unauthorized access to personal information of the users.

SUMMARY

The system described in the present disclosure provides several practical applications and technical advantages that overcome the current technical problems for improving security of computing systems.

In general, the system for improving security using recursively generated QR codes includes a user device of a user communicatively coupled to a device of a service provide and a server of an interaction provider. The device of a desired service provider displays a preliminary QR code and may request the user to perform an interaction based on the preliminary QR code. The preliminary QR code has a substantially blank region and includes an identification feature of the desired service provider. The identification feature is configured to identify the desired service provider to the interaction provider. The user device captures the preliminary QR code displayed by the device of the desired service provider and displays the preliminary QR code. The user device analyzes the identification feature to determine a name of a corresponding service provider. In response to determining that the name of the corresponding service provider matches a name of the desired service provider, the user device analyzes the identification feature to determine an identification credential of the desired service provider and information of the interaction provider. In response to determining that the identification credential matches a stored identification credential stored in the server of the interaction provider, the user device generates a QR code to perform the interaction requested from the desired service provider. Generating the QR code includes requesting the QR code from the server of the interaction provider. The server of the interaction provider generates a plurality of directed acyclic graphs (DAGs). The DAGs comprise information to generate the QR code. The user device receives a first directed acyclic graph (DAG) from the server of the interaction provider, generates a first portion of the QR code based on the first DAG, adds the first portion of the QR code to the preliminary QR code to generate a first intermediate QR code, and displays the first intermediate QR code. This process is repeated until all DAGs are received from the server of the interaction provider and the QR code is generated. The user device displays the QR code. In response to determining that the QR code corresponds to the DAGs received from the server of the interaction provider, the user device performs the interaction based on the QR code. In response to determining that the name of the corresponding service provider does not match the name of the desired service provider, the user device generates a first alert indicating a potential security breach and displays the first alert. In response to determining that the identification credential does not match the stored identification credential, the user device generates a second alert indicating a potential security breach and displays the second alert. In response to determining that the QR code does not correspond to the DAGs received from the server of the interaction provider, the user device generates a third alert indicating a potential security breach and displays the third alert.

The system for improving security using recursively generated QR codes allows for securely performing interactions that are requested by service providers. By generating the QR codes in a recursive manner using directed acyclic graphs allows for performing multiple check processes during the QR code generation process for detecting potential security breaches. The multiple check processes improve the security of the QR codes, and the security of interactions performed using the QR codes. By improving the security of interactions, the security of computing systems is also improved.

Accordingly, the following disclosure is particularly integrated into practical applications of: (1) improving security of QR codes; (2) improving security of interaction requested by service providers using QR codes; and (3) improving security of computing systems.

In one embodiment, a system includes: a server of an interaction provider, wherein the server includes: a first memory configured to store: identification credentials for a plurality of service providers; and a first processor communicatively coupled to the first memory, wherein the first processor is configured to: generate one or more directed acyclic graphs (DAGs), wherein the one or more DAGs include information to generate a quick response (QR) code; and a user device communicatively coupled to the server, wherein the user device includes: a second processor configured to: capture a preliminary quick response (QR) code displayed by a device of a desired service provider, wherein the preliminary QR code has a substantially blank region and includes an identification feature of the desired service provider, the identification feature configured to identify the desired service provider to the interaction provider; display the preliminary QR code; analyze the identification feature to determine a name of a corresponding service provider; in response to determining that the name of the corresponding service provider matches a name of the desired service provider, analyze the identification feature to determine an identification credential of the desired service provider and information of the interaction provider; and in response to determining that the identification credential matches a stored identification credential stored in the server of the interaction provider: request a QR code from the server of the interaction provider to perform an interaction requested by the desired service provider; receive a first DAG from the server of the interaction provider; generate a first portion of the QR code based on the first DAG; add the first portion of the QR code to the preliminary QR code to generate a first intermediate QR code; display the first intermediate QR code; and perform one or more recursion operations until the QR code is generated from the preliminary QR code, wherein performing each recursion operation includes: analyzing an identification feature of a current intermediate QR code to determine a new identification credential; and in response to determining that the new identification credential matches the stored identification credential: receiving a subsequent DAG from the server of the interaction provider; generating a subsequent portion of the QR code based on the subsequent DAG; adding the subsequent portion of the QR code to the current intermediate QR code to generate a subsequent intermediate QR code; and displaying the subsequent intermediate QR code.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

As described above, previous technologies face challenges for improving security of computing systems. Embodiments of the present disclosure and their advantages may be understood by referring to FIGS. 1, 2, 3, 4A, 4B, and 4C. FIGS. 1, 2, 3, 4A, 4B, and 4C are used to describe a system and method for improving security using recursively generated quick response codes.

System Overview

Figure 1:
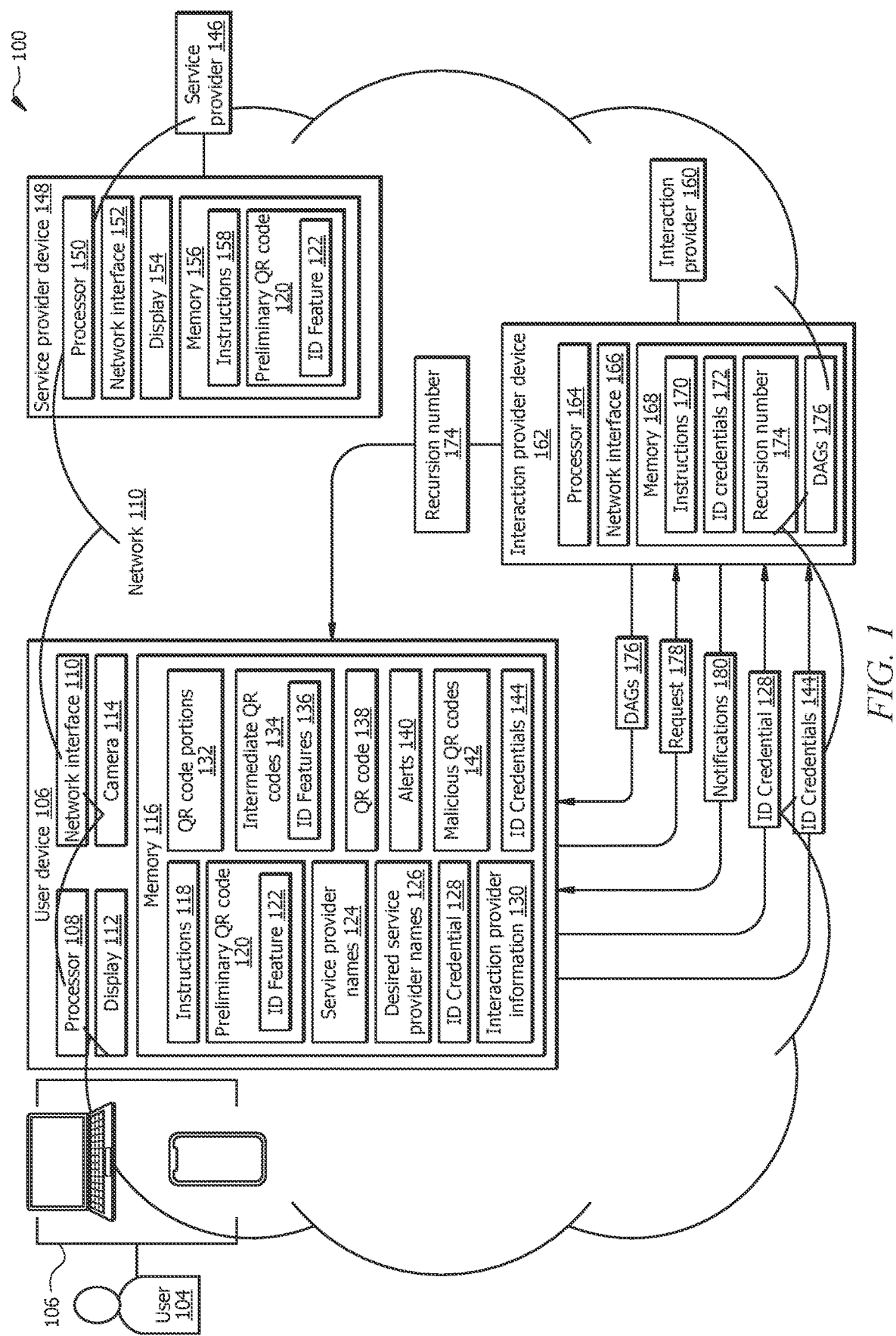
FIG. 1 illustrates an embodiment of a system for improving security using recursively generated quick response codes.

FIG. 1 illustrates an embodiment of a system 100 for improving security using recursively generated quick response codes. In certain embodiments, the system 100 comprises a user device 106 of a user 104 operably coupled to a service provider device 148 of a service provider 146, and an interaction provider server 162 of an interaction provider 160 via a network 102. Network 102 enables the communication between the components of the system 100. In other embodiments, the system 100 may not have all the components listed and/or may have other elements instead of, or in addition to, those listed above. The service provider 146 may be a merchant, a store, a business, or the like. The interaction provider 160 may be a financial institution, a bank, or the like.

In general, the desired service provider 146 may request the user 104 to perform an interaction before delivering a desired service to the user 104. The service provider device 148 of the desired service provider 146 generates and displays a preliminary QR code 120, which is used by the user device 106 to generate the QR code 138 and perform the requested interaction. The preliminary QR code 120 has a substantially blank region and includes an identification feature 122 of the desired service provider 146. The identification feature 122 is configured to identify the desired service provider 146 to the interaction provider 160. The identification feature 122 may comprise a pattern that encodes an identification credential 128 of the desired service provider 146. The user device 106 captures the preliminary QR code 120 displayed by the service provider device 148 of the desired service provider 146 and displays the preliminary QR code 120.

The user device 106 analyzes the identification feature 122 to determine a name 124 of a corresponding service provider. In certain embodiments when a malicious user replaces or alters the preliminary QR code 120 on the user device 106 with a malicious QR code 142, the corresponding service provider may not match the desired service provider 146. In other words, the name 124 may not match a name 126 of the desired service provider 146.

The user device 106 determines if the name 124 of the corresponding service provider matches the name 126 of the desired service provider 146. In response to determining that the name 124 of the corresponding service provider does not match the name 126 of the desired service provider 146, the user device 106 generates and displays an alert 140 indicating a potential security breach.

In response to determining that the name 124 of the corresponding service provider matches the name 126 of the desired service provider 146, the user device 106 analyzes the identification feature 122 to determine the identification credential 128 of the desired service provider 146 and information 130 of the interaction provider 160. In certain embodiments, the information 130 may comprise a uniform resource locator (URL) or an internet protocol (IP) address for the interaction provider server 162 of the interaction provider 160.

The user device 106 sends the identification credential 128 of the desired service provider 146 to the interaction provider server 162 of the interaction provider 160. In certain embodiments when a malicious user replaces or alters the preliminary QR code 120 on the user device 106 with a malicious QR code 142, the determined identification credential may not be the same as the identification credential 128 of the desired service provider 146.

The interaction provider server 162 of the interaction provider 160 determines if the identification credential 128 matches a stored identification credential 172 that is stored in the interaction provider server 162.

In response to determining that the identification credential 128 does not match the stored identification credential 172, the user device 106 generates and displays an alert 140 indicating a potential security breach.

In response to determining that the identification credential 128 matches the stored identification credential 172, the user device 106 requests the QR code 138 from the interaction provider server 162 of the interaction provider 160 to perform the requested interaction.

The interaction provider server 162 of the interaction provider 160 generates a recursion number 174. The recursion number 174 indicates a number of recursions for generating the QR code 138. The interaction provider server 162 of the interaction provider 160 generates a first directed acyclic graph (DAG) (e.g., respective one of DAGs 176).

The user device 106 receives the recursion number 174 and the first DAG (e.g., respective one of DAGs 176) from the interaction provider server 162 of the interaction provider 160. The user device 106 generates a first portion (e.g., respective one of QR code portions 132) of the QR code 138 based on the first DAG (e.g., respective one of DAGs 176). The user device 106 adds the first portion (e.g., respective one of QR code portions 132) of the QR code 138 to the preliminary QR code 120 to generate a first intermediate QR code (e.g., respective one of intermediate QR codes 134 of FIG. 1) and displays the first intermediate QR code (e.g., respective one of intermediate QR codes 134).

The user device 106 is further configured to perform one or more recursion operations on the preliminary QR code 120 until the QR code 138 is generated. While performing a recursion operation, the user device 106 analyzes an identification feature (e.g., respective one of identification features 136) of a current intermediate QR code (e.g., respective one of intermediate QR codes 134) to determine a new identification credential 144. In certain embodiments when a malicious user replaces or alters the current intermediate QR code (e.g., respective one of intermediate QR codes 134) on the user device 106 with a malicious QR code 142, the new identification credential 144 may not match the identification credential 128 of the desired service provider 146.

The user device 106 sends the new identification credential 144 to the interaction provider server 162 of interaction provider 160. The user device 106 determines if the new identification credential 144 matches the stored identification credential 172.

In response to determining that the new identification credential 144 does not match the stored identification credential 172, the interaction provider server 162 of the interaction provider 160, sends a notification 180 to the user device 106. The notification 180 indicates that the new identification credential 144 does not match the stored identification credential 172. In response to receiving the notification 180, the user device 106 generates and displays an alert 140 indicating a potential security breach.

In response to determining that the new identification credential 144 matches the stored identification credential 172, the interaction provider server 162 of the interaction provider 160 generates a subsequent DAG (e.g., respective one of DAGs 176).

The user device 106 receives the subsequent DAG (e.g., respective one of DAGs 176) from the interaction provider server 162 of the interaction provider 160 and generates a subsequent portion (e.g., respective one of QR code portions 132) of the QR code 138 based on the subsequent DAG (e.g., respective one of DAGs 176). The user device 106 adds the subsequent portion (e.g., respective one of QR code portions 132) of the QR code 138 to the current intermediate QR code (e.g., respective one of intermediate QR codes 134) to generate a subsequent intermediate QR code (e.g., respective one of intermediate QR codes 134) and displays the subsequent intermediate QR code (e.g., respective one of intermediate QR codes 134). This process may be repeated until all subsequent DAGs (e.g., respective ones of DAGs 176) are received that the QR codes 138 is generated.

The user device 106 determines if the QR code 138 corresponds to the DAGs 176. In certain embodiments when a malicious user replaces or alters the QR code 138 on the user device 106 with a malicious QR code 142, the malicious QR code 142 may not correspond to the DAGs 176. In response to determining that the QR code 138 does not correspond to the DAGs 176, the user device 106 generates and displays an alert 140 indicating a potential security breach. In response to determining that the QR code 138 corresponds to the DAGs 176, the user device 106 performs the interaction based on the QR code 138. In embodiments when the desired service provider 146 is a merchant and the interaction provider 160 is a bank, the interaction may comprise a financial transaction.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

User Device

The user device 106 is generally any device that is configured to process data and interact with a user 104. Examples of a user device include, but are not limited to, a personal computer, a desktop computer, a workstation, a server, a laptop, a tablet computer, a mobile phone (such as a smartphone), a virtual reality (VR) headset, etc. The user device 106 may include a display 112, a camera 114, a microphone, a speaker, one or more sensors, and/or a keypad.

The user device 106 may comprise a processor 108 in signal communication with a memory 116 and a network interface 110. The processor 108 comprises one or more processors operably coupled to the memory 116. The processor 108 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The one or more processors are configured to process data and may be implemented in hardware or software. For example, each of the processor 108 may be 8-bit, 16-bit, 32-bit, 64-bit, or of any other suitable architecture. The one or more processors are configured to implement various software instructions to perform the operations described herein. For example, the one or more processors are configured to execute software instructions 118 and perform one or more functions described herein.

The network interface 110 is configured to enable wired and/or wireless communications (e.g., via network 102). The network interface 110 is configured to communicate data between the user device 106 and other components of the system 100. For example, the network interface 110 may comprise a WIFI interface, a local area network (LAN) interface, a wide area network (WAN) interface, a modem, a switch, or a router. The processor 108 is configured to send and receive data using the network interface 110. The network interface 110 may be configured to use any suitable type of communication protocol as would be appreciated by one of ordinary skill in the art.

The memory 116 may be volatile or non-volatile and may comprise a read-only memory (ROM), random-access memory (RAM), ternary content-addressable memory (TCAM), dynamic random-access memory (DRAM), and static random-access memory (SRAM). The memory 116 may be implemented using one or more disks, tape drives, solid-state drives, and/or the like. The memory 116 may store any of the information described in FIGS. 1, 2, 3, 4A, 4B, and 4C along with any other data, instructions, logic, rules, or code operable to implement the function(s) described herein when executed by the processor 108. The memory 116 is operable to store the software instructions 118, and/or any other data and instructions. The software instructions 118 may comprise any suitable set of software instructions, logic, rules, or code operable to be executed by the processor 108.

In operation, the user device 106 is configured to capture a preliminary QR code 120 displayed by the service provided device 148 of the desired service provider 146. The preliminary QR code 120 has a substantially blank region and includes an identification feature 122 of the desired service provider 146. The identification feature 122 is configured to identify the desired service provider 146 to the interaction provider 160. The identification feature 122 may comprise a pattern that encodes an identification credential 128 of the desired service provider 146. In certain embodiments, the processor 108 of the user device 106 instructs the camera 114 of the user device 106 to capture the preliminary QR code 120. The user device 106 displays the preliminary QR code 120. In certain embodiments, the processor 108 of the user device 106 instructs the display 112 of the user device 106 to display the preliminary QR code 120.

The processor 108 of the user device 106 analyzes the identification feature 122 to determine a name 124 of a corresponding service provider. In certain embodiments when a malicious user replaces or alters the preliminary QR code 120 on the user device 106 with a malicious QR code 142, the corresponding service provider may not match the desired service provider 146. In other words, the name 124 may not match a name 126 of the desired service provider 146.

The processor 108 of the user device 106 determines if the name 124 of the corresponding service provider matches the name 126 of the desired service provider 146. In certain embodiments, the processor 108 of the user device 106 may instruct the display 112 to display the name 124 of the corresponding service provider and may request the user 104 to confirm if the name 124 of the corresponding service provider matches the name 126 of the desired service provider 146. When the user 104 confirms that the name 124 of the corresponding service provider matches the name 126 of the desired service provider 146, the processor 108 of the user device 106 determines that the name 124 of the corresponding service provider matches the name 126 of the desired service provider 146. When the user 104 does not confirm that the name 124 of the corresponding service provider matches the name 126 of the desired service provider 146, the processor 108 of the user device 106 determines that the name 124 of the corresponding service provider does not match the name 126 of the desired service provider 146.

In response to determining that the name 124 of the corresponding service provider does not match the name 126 of the desired service provider 146, the processor 108 of the user device 106 generates and displays an alert 140 indicating a potential security breach. In certain embodiments, the processor 108 of the user device 106 instructs the display 112 of the user device 106 to display the alert 140.

In response to determining that the name 124 of the corresponding service provider matches the name 126 of the desired service provider 146, the processor 108 of the user device 106 analyzes the identification feature 122 to determine the identification credential 128 of the desired service provider 146 and information 130 of the interaction provider 160. In certain embodiments, the information 130 may comprise a uniform resource locator (URL) or an internet protocol (IP) address for a server 162 of the interaction provider 160.

The processor 108 of the user device 106 sends the identification credential 128 of the desired service provider 146 to the interaction provider server 162 of the interaction provider 160. In certain embodiments when a malicious user replaces or alters the preliminary QR code 120 on the user device 106 with a malicious QR code 142, the determined identification credential may not be the same as the identification credential 128 of the desired service provider 146.

In response to determining that the identification credential 128 does not match the stored identification credential 172, the processor 108 of the user device 106 generates and displays an alert 140 indicating a potential security breach. In certain embodiments, the processor 108 of the user device 106 instructs the display 112 of the user device 106 to display the alert 140.

In response to determining that the identification credential 128 matches the stored identification credential 172, the processor 108 of the user device 106 requests a QR code 138 from the interaction provider server 162 of the interaction provider 160 to perform an interaction.

The processor 108 of the user device 106 receives a recursion number 174 and a first DAG (e.g., respective one of DAGs 176) from the interaction provider server 162 of the interaction provider 160. The processor 108 of the user device 106 generates a first portion (e.g., respective one of QR code portions 132) of the QR code 138 based on the first DAG (e.g., respective one of DAGs 176). The processor 108 of the user device 106 adds the first portion (e.g., respective one of QR code portions 132) of the QR code 138 to the preliminary QR code 120 to generate a first intermediate QR code (e.g., respective one of intermediate QR codes 134) and displays the first intermediate QR code (e.g., respective one of intermediate QR codes 134). In certain embodiments, the processor 108 of the user device 106 instructs the display 112 of the user device 106 to display the first intermediate QR code (e.g., respective one of intermediate QR codes 134).

The processor 108 of the user device 106 is further configured to perform one or more recursion operations on the preliminary QR code 120 until the QR code 138 is generated. While performing a recursion operation, the processor 108 of the user device 106 analyzes an identification feature (e.g., respective one of identification features 136) of a current intermediate QR code (e.g., respective one of intermediate QR codes 134) to determine a new identification credential 144. In certain embodiments when a malicious user replaces or alters the current intermediate QR code (e.g., respective one of intermediate QR codes 134) on the user device 106 with a malicious QR code 142, the new identification credential 144 may not match the identification credential 128 of the desired service provider 146. The processor 108 of the user device 106 sends the new identification credential 144 to the server 162 of interaction provider 160. The processor 108 of the user device 106 determines if the new identification credential 144 matches the stored identification credential 172.

In response to determining that the new identification credential 144 does not match the stored identification credential 172, the processor 108 of the user device 106 generates and displays an alert 140 indicating a potential security breach. In certain embodiments, the processor 108 of the user device 106 instructs the display 112 of the user device 106 to display the alert 140.

In response to determining that the new identification credential 144 matches the stored identification credential 172, the processor 108 of the user device 106 receives a subsequent DAG (e.g., respective one of DAGs 176) from the interaction provider server 162 of the interaction provider 160 and generates a subsequent portion (e.g., respective one of QR code portions 132) of the QR code 138 based on the subsequent DAG (e.g., respective one of DAGs 176).

The processor 108 of the user device 106 adds the subsequent portion (e.g., respective one of QR code portions 132) of the QR code 138 to the current intermediate QR code (e.g., respective one of intermediate QR codes 134) to generate a subsequent intermediate QR code (e.g., respective one of intermediate QR codes 134) and displays the subsequent intermediate QR code (e.g., respective one of intermediate QR codes 134). In certain embodiments, the processor 108 of the user device 106 instructs the display 112 of the user device 106 to display the subsequent intermediate QR code (e.g., respective one of intermediate QR codes 134).

In response to determining that all recursion operations are performed, the user device 106 displays the QR code 138. In certain embodiments, the processor 108 of the user device 106 instructs the display 112 of the user device 106 to display the QR code 138.

The processor 108 of the user device 106 determines if the QR code 138 corresponds to the DAGs 176. In certain embodiments when a malicious user replaces or alters the QR code 138 on the user device 106 with a malicious QR code 142, the malicious QR code 142 may not correspond to the DAGs 176.

In response to determining that the QR code 138 does not correspond to the DAGs 176, the processor 108 of the user device 106 generates and displays an alert 140 indicating a potential security breach. In certain embodiments, the processor 108 of the user device 106 instructs the display 112 of the user device 106 to display the alert 140. In response to determining that the QR code 138 corresponds to the DAGs 176, the processor 108 of the user device 106 performs the interaction based on the QR code 138.

Figure 2:
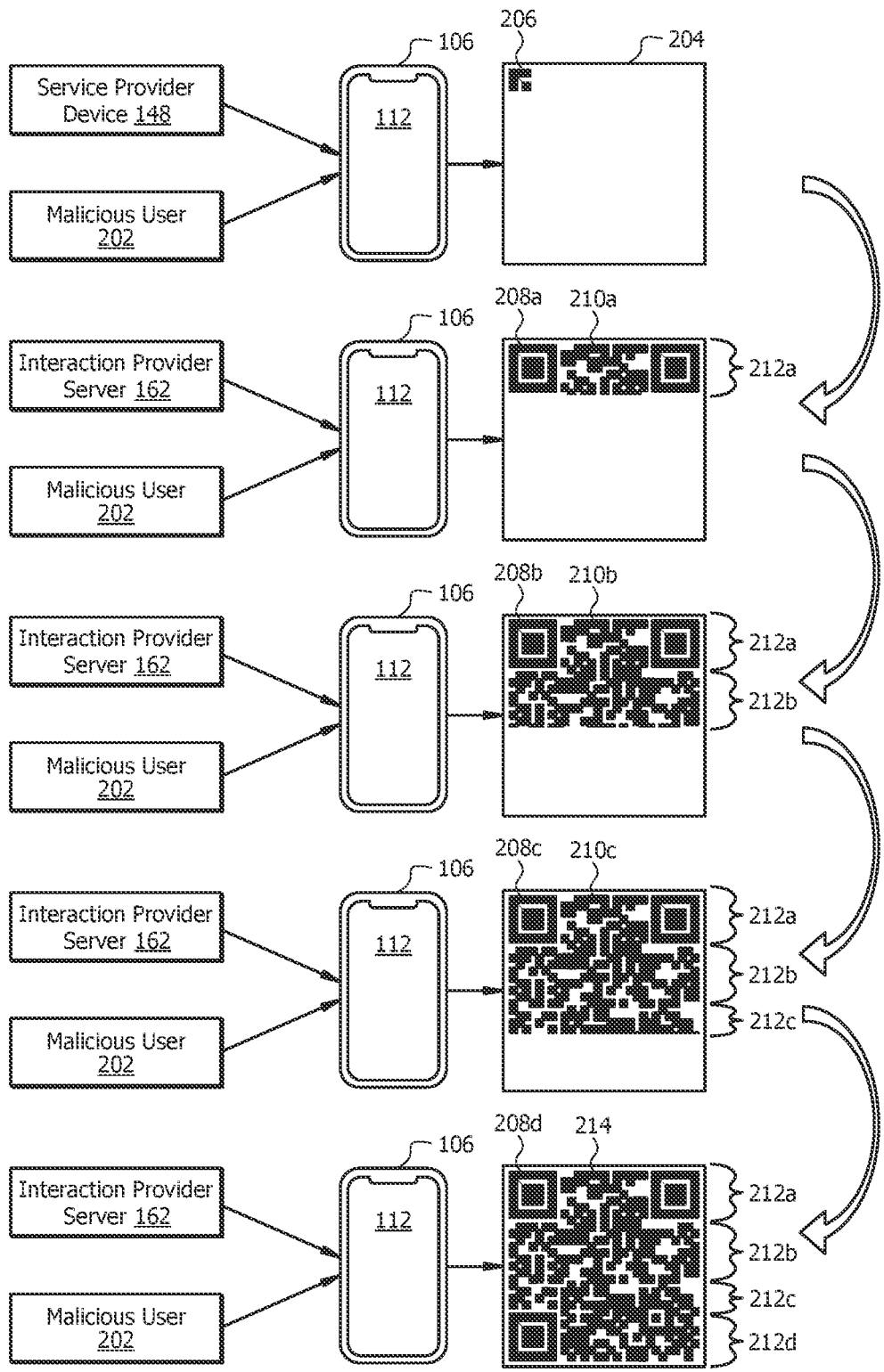
FIG. 2 illustrates an exemplary process for generating a quick response code.

FIG. 2 illustrates an exemplary process for generating a QR code 214. In the illustrated embodiment, the recursion number 174 (see FIG. 1) is four and the QR code 214 is generated by performing four recursion operations on a preliminary QR code 204. The user device 106 captures the preliminary QR code 204 displayed by the service provider device 148 and displays the preliminary QR code 204 using the display 112. The preliminary QR code 204 has a substantially blank region and includes an identification feature 206 of the desired service provider 146 (see FIG. 1). The identification feature 206 is configured to identify the desired service provider 146 to the interaction provider 160 (see FIG. 1). The identification feature 206 may comprise a pattern that encodes an identification credential (e.g., identification credential 128 of FIG. 1) of the desired service provider 146.

At first recursion operation, the user device 106 analyzes the identification feature 206 of the preliminary QR code 204 to determine an identification credential (e.g., identification credential 128 of FIG. 1). In response to determining that the identification credential (e.g., identification credential 128 of FIG. 1) matches a stored identification credential (e.g., respective one of identification credentials 172 of FIG. 1) stored in the interaction provider server 162, the user device 106 receives a first DAG (e.g., respective one of DAGs 176 of FIG. 1) from the interaction provider server 162, generates a first QR code portion 212a based on the first DAG (e.g., respective one of DAGs 176 of FIG. 1), adds the first QR code portion 212a to the preliminary QR code 204 to generate a first intermediate QR code 210a, and displays the first intermediate QR code 210a.

In certain embodiments, a malicious user 202 may replace or alter the preliminary QR code 204 with a malicious QR code (e.g., malicious QR code 142 of FIG. 1). In such embodiments, an identification credential determined from the malicious QR code (e.g., malicious QR code 142 of FIG. 1) may not match the stored identification credential (e.g., respective on of identification credentials 172 of FIG. 1). In response to determining that the identification credential does not match the stored identification credential (e.g., respective on of identification credentials 172 of FIG. 1), the user device 106 generates and displays a first alert (e.g., respective one of alerts 140 in FIG. 1) indicating a potential security breach.

At second recursion operation, the user device 106 analyzes the identification feature 208a of the first intermediate QR code 210a to determine a first new identification credential (e.g., respective one of identification credentials 144 of FIG. 1). In embodiments when the first intermediate QR code 210a is not replaced or altered by the malicious user 202, the identification feature 208a matches the identification feature 206 of the preliminary QR code 204, and the first new identification credential (e.g., respective one of identification credentials 144 of FIG. 1) matches the identification credential (e.g., identification credential 128 of FIG. 1) determined from the identification feature 206. In response to determining that the first new identification credential (e.g., respective one of identification credentials 144 of FIG. 1) matches the stored identification credential (e.g., respective on of identification credentials 172 of FIG. 1), the user device 106 receives a second DAG (e.g., respective one of DAGs 176 of FIG. 1) from the interaction provider server 162, generates a second QR code portion 212b based on the second DAG, adds the second QR code portion 212b to the first intermediate QR code 210a to generate a second intermediate QR code 210b, and displays the second intermediate QR code 210b.

In certain embodiments, the malicious user 202 may replace or alter the first intermediate QR code 210a with a malicious QR code (e.g., malicious QR code 142 of FIG. 1), such that the identification feature 208a does not match the identification feature 206. In such embodiments, the first new identification credential determined from the identification feature 208a may not match the identification credential (e.g., identification credential 128 of FIG. 1) determined from the identification feature 206 and the stored identification credential (e.g., respective on of identification credentials 172 of FIG. 1). In response to determining that the first new identification credential determined from the identification feature 208a does not match the stored identification credential (e.g., respective on of identification credentials 172 of FIG. 1), the user device 106 generates and displays a second alert (e.g., respective one of alerts 140 in FIG. 1) indicating a potential security breach.

At third recursion operation, the user device 106 analyzes the identification feature 208b of the second intermediate QR code 210b to determine a second new identification credential (e.g., respective one of identification credentials 144 of FIG. 1). In embodiments when the second intermediate QR code 210b is not replaced or altered by the malicious user 202, the identification feature 208b matches the identification feature 206, and the second new identification credential (e.g., respective one of identification credentials 144 of FIG. 1) determined from the identification feature 208b matches the identification credential (e.g., identification credential 128 of FIG. 1) determined from the identification feature 206. In response to determining that the second new identification credential (e.g., respective one of identification credentials 144 of FIG. 1) determined from the identification feature 208b matches the stored identification credential (e.g., respective on of identification credentials 172 of FIG. 1), the user device 106 receives a third DAG (e.g., respective one of DAGs 176 of FIG. 1) from the interaction provider server 162, generates a third QR code portion 212c based on the third DAG (e.g., respective one of DAGs 176 of FIG. 1), adds the third QR code portion 212c to the second intermediate QR code 210b to generate a third intermediate QR code 210c, and displays the third intermediate QR code 210c.

In certain embodiments, the malicious user 202 may replace or alter the second intermediate QR code 210b with a malicious QR code (e.g., malicious QR code 142 of FIG. 1), such that the identification feature 208b of the second intermediate QR code 210b does not match the identification feature 206 of the preliminary QR code 204. In such embodiments, the second new identification credential (e.g., respective one of identification credentials 144 of FIG. 1) determined from the identification feature 208b may not match the identification credential (e.g., identification credential 128 of FIG. 1) determined from the identification feature 206 and the stored identification credential (e.g., identification credential 172 of FIG. 1). In response to determining that the second new identification credential (e.g., respective one of identification credentials 144 of FIG. 1) determined from the identification feature 208b does not match the stored identification credential (e.g., respective on of identification credentials 172 of FIG. 1), the user device 106 generates and displays a third alert (e.g., respective one of alerts 140 in FIG. 1) indicating a potential security breach.

At fourth recursion operation, the user device 106 analyzes the identification feature 208c of the third intermediate QR code 210c to determine a third new identification credential (e.g., respective one of identification credentials 144 of FIG. 1). In embodiments when the third intermediate QR code 210c is not replaced or altered by the malicious user 202, the identification feature 208c matches the identification feature 206, and the third new identification credential (e.g., respective one of identification credentials 144 of FIG. 1) determined from the identification feature 208c matches the identification credential (e.g., identification credential 128 of FIG. 1) determined from the identification feature 206. In response to determining that the third new identification credential (e.g., respective one of identification credentials 144 of FIG. 1) determined from the identification feature 208c matches the stored identification credential (e.g., respective on of identification credentials 172 of FIG. 1), the user device 106 receives a fourth DAG (e.g., respective one of DAGs 176 of FIG. 1) from the interaction provider server 162, generates a fourth QR code portion 212d based on the fourth DAG (e.g., respective one of DAGs 176 of FIG. 1), adds the fourth QR code portion 212d to the third intermediate QR code 210c to generate the QR code 214, and displays the QR code 214.

In certain embodiments, the malicious user 202 may replace or alter the third intermediate QR code 210c with a malicious QR code (e.g., malicious QR code 142 of FIG. 1), such that the identification feature 208c of the third intermediate QR code 210c does not match the identification feature 206 of the preliminary QR code 204. In such embodiments, the third new identification credential (e.g., respective one of identification credentials 144 of FIG. 1) determined from the identification feature 208c may not match the identification credential (e.g., identification credential 128 of FIG. 1) determined from the identification feature 206 and the stored identification credential (e.g., respective on of identification credentials 172 of FIG. 1). In response to determining that the third new identification credential (e.g., respective one of identification credentials 144 of FIG. 1) determined from the identification feature 208c does not match the stored identification credential (e.g., respective on of identification credentials 172 of FIG. 1), the user device 106 generates and displays a fourth alert (e.g., respective one of alerts 140 in FIG. 1) indicating a potential security breach.

Figure 3:
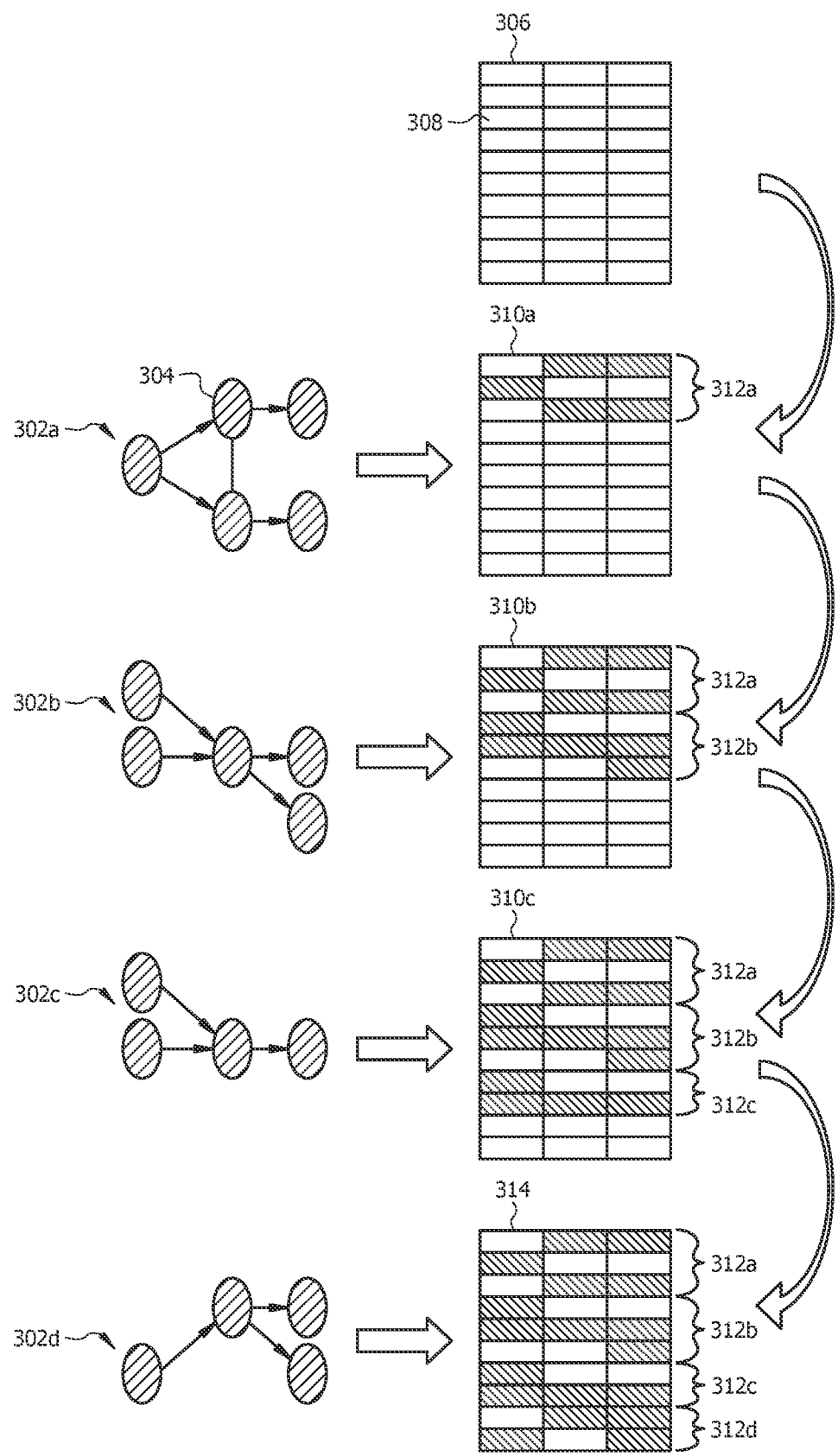
FIG. 3 illustrates exemplary directed acyclic graphs and corresponding intermediate and final quick response codes.

FIG. 3 illustrates exemplary directed acyclic graphs (DAGs) and corresponding intermediate and final quick response (QR) codes. In the illustrated embodiment, the recursion number 174 (see FIG. 1) is four and a QR code 314 is generated by performing four recursion operations on a preliminary QR code 306. The QR code 314 is generated from the preliminary QR code 306 based on DAGs 302a through 302d. In certain embodiments, the preliminary QR code 306 comprises a plurality of pixels 308 and the DAGs 302a through 302d provide information how to fill the plurality of pixels 308 to generate the QR code 314. Nodes 304 of the DAGs 302a through 302d indicate locations of respective pixels of the plurality of pixels 308 that will be filled during the recursion operations to generate a pattern of the QR code 314.

At first recursion operation, the user device 106 (see FIG. 1) receives a first DAG 302a from the interaction provider server 162 (see FIG. 1), generates a first QR code portion 312a based on the first DAG 302a, adds the first QR code portion 312a to the preliminary QR code 306 to generate a first intermediate QR code 310a, and displays the first intermediate QR code 310a.

At second recursion operation, the user device 106 receives a second DAG 302b from the interaction provider server 162, generates a second QR code portion 312b based on the second DAG 302b, adds the second QR code portion 312b to the first intermediate QR code 310a to generate a second intermediate QR code 310b, and displays the second intermediate QR code 310b. In the illustrated embodiment, the second DAG 302b is different from the first DAG 302a, and the second QR code portion 312b is different from the first QR code portion 312a.

At third recursion operation, the user device 106 receives a third DAG 302c from the interaction provider server 162, generates a third QR code portion 312c based on the third DAG 302c, adds the third QR code portion 312c to the second intermediate QR code 310b to generate a third intermediate QR code 310c, and displays the third intermediate QR code 310c. In the illustrated embodiment, the third DAG 302c is different from the second DAG 302b and the first DAGs 302a, and the third QR code portion 312c is different from the second QR code portion 312b and the first QR code portion 312a.

At fourth recursion operation, the user device 106 receives a fourth DAG 302d from the interaction provider server 162, generates a fourth QR code portion 312d based on the fourth DAG 302d, adds the fourth QR code portion 312d to the third intermediate QR code 310c to generate the QR code 314, and displays the QR code 314. In the illustrated embodiment, the fourth DAG 302d is different from the third DAG 302c, the second DAG 302b and the first DAG 302a, and the fourth QR code portion 312d is different from the third QR code portion 312c, the second QR code portion 312b and the first QR code portion 312a.

Service Provider Device

The service provider device 148 is generally any device that is configured to process data and communicate with other components of the system 100 via the network 102. The service provider device 148 may comprise a processor 150 in signal communication with a memory 156 and a network interface 152. In certain embodiments, the service provider device 148 may further comprise a display 154. The service provider device 148 may belong to a service provider 146. The service provider 146 may be a merchant, a store, a business, or the like.

Processor 150 comprises one or more processors operably coupled to the memory 156. The processor 150 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 150 may be a programmable logic device, a microcontroller, a microprocessor, or any suitable combination of the preceding. The one or more processors are configured to process data and may be implemented in hardware or software. For example, the processor 150 may be 8-bit, 16-bit, 32-bit, 64-bit, or of any other suitable architecture. The one or more processors are configured to implement various software instructions to perform the operations described herein. For example, the one or more processors are configured to execute software instructions 158 and perform one or more functions described herein.

Network interface 152 is configured to enable wired and/or wireless communications (e.g., via network 102). The network interface 152 is configured to communicate data between the service provider device 148 and other components of the system 100. For example, the network interface 152 may comprise a WIFI interface, a local area network (LAN) interface, a wide area network (WAN) interface, a modem, a switch, or a router. The processor 150 is configured to send and receive data using the network interface 152. The network interface 152 may be configured to use any suitable type of communication protocol as would be appreciated by one of ordinary skill in the art.

Memory 156 may be volatile or non-volatile and may comprise a read-only memory (ROM), random-access memory (RAM), ternary content-addressable memory (TCAM), dynamic random-access memory (DRAM), and static random-access memory (SRAM). Memory 156 may be implemented using one or more disks, tape drives, solid-state drives, and/or the like. The memory 156 may store any of the information described in FIGS. 1, 2, 3, 4A, 4B, and 4C along with any other data, instructions, logic, rules, or code operable to implement the function(s) described herein. The memory 156 is operable to store software instructions 158, and/or any other data and instructions. The software instructions 158 may comprise any suitable set of software instructions, logic, rules, or code operable to be executed by the processor 150.

In operation, the processor 150 of the service provider device 148 is configured to generate the preliminary QR code 120. The preliminary QR code 120 has a substantially blank region and includes an identification feature 122 of the desired service provider 146. The identification feature 122 is configured to identify the desired service provider 146 to the interaction provider 160. The identification feature 122 may comprise a pattern that encodes an identification credential 128 of the desired service provider 146. In certain embodiments, the processor 150 of the service provider device 148 instructs the display 154 of the service provider device 148 to display the preliminary QR code 120.

Interaction Provider Server

The interaction provider server 162 is generally any device that is configured to process data and communicate with other components of the system 100 via the network 102. The interaction provider server 162 may comprise a processor 164 in signal communication with a memory 168 and a network interface 166. The interaction provider server 162 may belong to an interaction provider 160. The interaction provider 160 may be a financial institution, a bank, or the like.

Processor 164 comprises one or more processors operably coupled to the memory 168. The processor 164 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 164 may be a programmable logic device, a microcontroller, a microprocessor, or any suitable combination of the preceding. The one or more processors are configured to process data and may be implemented in hardware or software. For example, the processor 164 may be 8-bit, 16-bit, 32-bit, 64-bit, or of any other suitable architecture. The one or more processors are configured to implement various software instructions to perform the operations described herein. For example, the one or more processors are configured to execute software instructions 170 and perform one or more functions described herein.

Network interface 166 is configured to enable wired and/or wireless communications (e.g., via network 102). The network interface 166 is configured to communicate data between the interaction provider server 162 and other components of the system 100. For example, the network interface 166 may comprise a WIFI interface, a local area network (LAN) interface, a wide area network (WAN) interface, a modem, a switch, or a router. The processor 164 is configured to send and receive data using the network interface 166. The network interface 166 may be configured to use any suitable type of communication protocol as would be appreciated by one of ordinary skill in the art.

Memory 168 may be volatile or non-volatile and may comprise a read-only memory (ROM), random-access memory (RAM), ternary content-addressable memory (TCAM), dynamic random-access memory (DRAM), and static random-access memory (SRAM). Memory 168 may be implemented using one or more disks, tape drives, solid-state drives, and/or the like. The memory 168 may store any of the information described in FIGS. 1, 2, 3, 4A, 4B, and 4C along with any other data, instructions, logic, rules, or code operable to implement the function(s) described herein. The memory 168 is operable to store software instructions 170, and/or any other data and instructions. The software instructions 170 may comprise any suitable set of software instructions, logic, rules, or code operable to be executed by the processor 164. The memory 168 may further store identification credentials 172 for a plurality of service providers.

In operation, the processor 164 of the interaction provider server 162 of the interaction provider 160 is configured to generate a recursion number 174 and directed acyclic graphs (DAGs) 176. The DAGs 176 comprise information for generating the QR code 138. The recursion number 174 equals a number of recursions for generating the QR code 138. The recursion number 174 further equals a number of graphs within the DAGs 176.

Figure 4A:
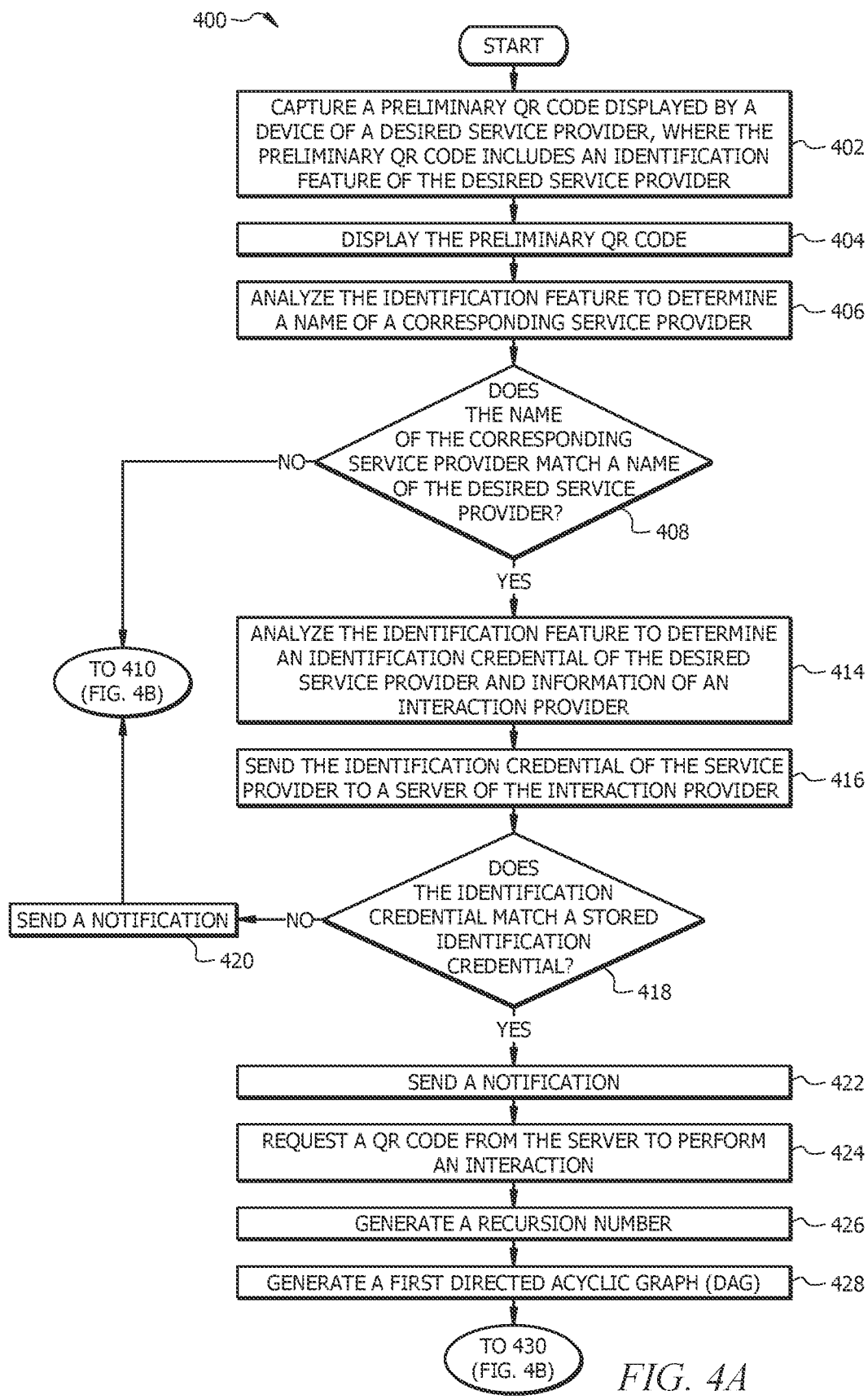
FIGS. 4A, 4B, and 4C illustrate an example operational flow of system of FIG. 1 for improving security using recursively generated quick response codes.
Figure 4B:
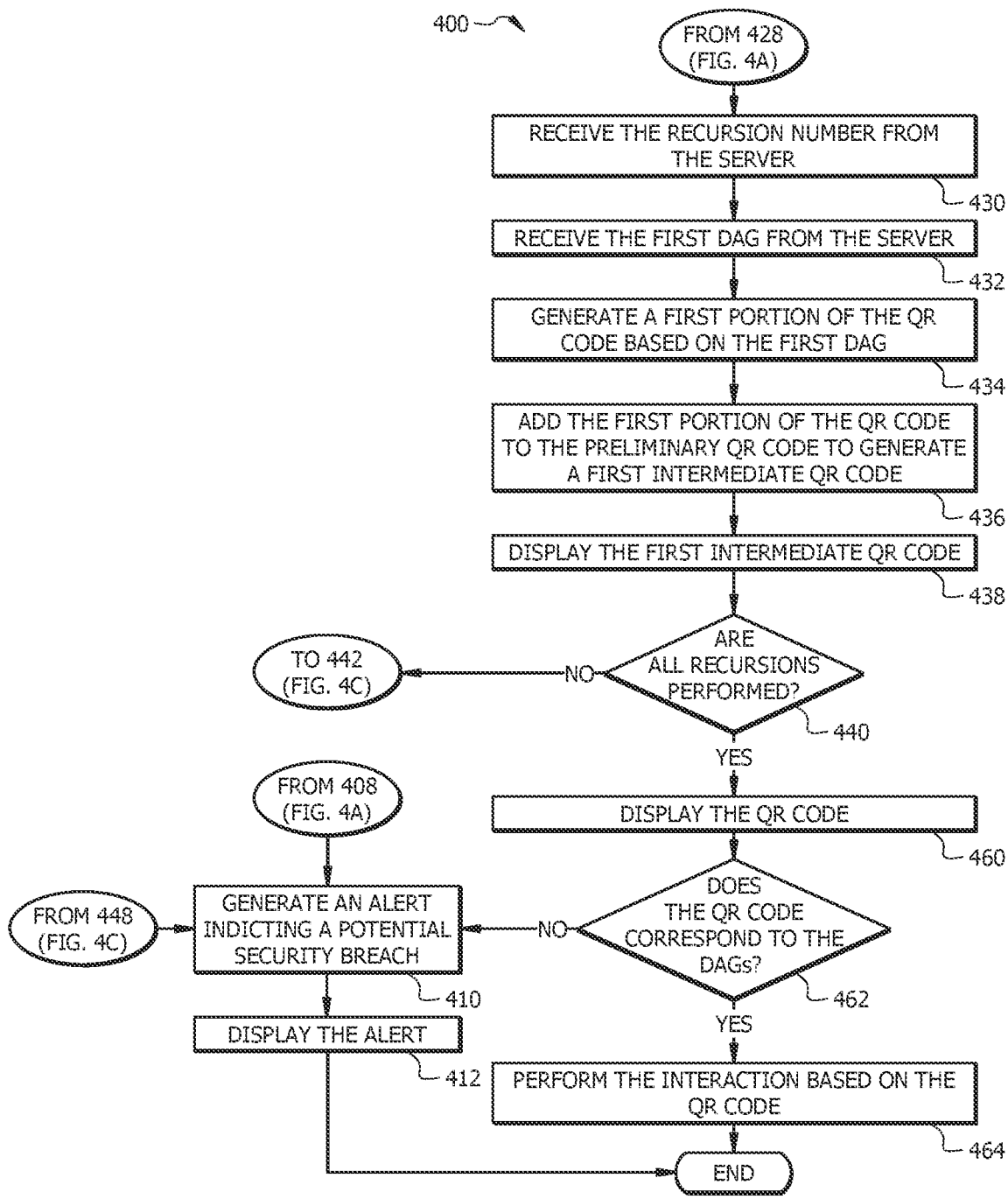
Figure 4C:
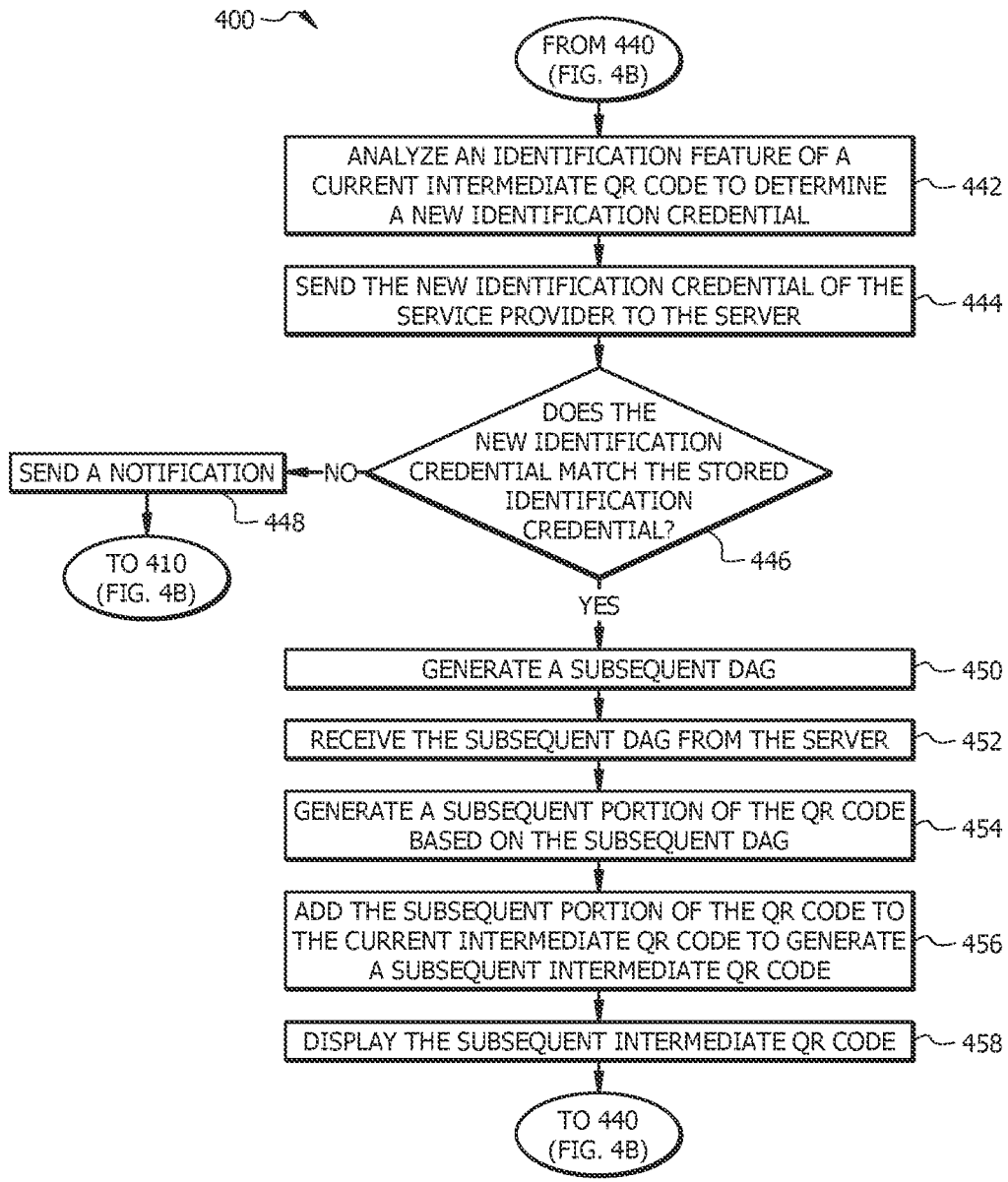

Example Method for Improving Security Using Recursively Generated Quick Response Codes FIGS. 4A, 4B, and 4C illustrate an example flowchart of a method 400 for improving security using recursively generated quick response codes. Modifications, additions, or omissions may be made to method 400. Method 400 may include more, fewer, or other operations. For example, operations may be performed in parallel or in any suitable order. For example, one or more operations of method 400 may be implemented, at least in part, in the form of the software instructions (e.g., instructions 118, 158, and/or 170 of FIG. 1), stored on non-transitory, tangible, machine-readable medium (e.g., memories 116, 156, and/or 168 of FIG. 1) that when executed by one or more processors (e.g., processors 108, 150, and/or 164 of FIG. 1) may cause the one or more processors to perform operations 402-464.

Method 400 starts with operation 402, where a user device 106 captures a preliminary QR code 120 displayed by a device 148 of a desired service provider 146. The preliminary QR code 120 has a substantially blank region and includes an identification feature 122 of the desired service provider 146. The identification feature 122 is configured to identify the desired service provider 146 to an interaction provider 160. The identification feature 122 may comprise a pattern that encodes an identification credential 128 of the desired service provider 146. In certain embodiments, a processor 108 of the user device 106 instructs a camera 114 of the user device 106 to capture the preliminary QR code 120.

At operation 404, the user device 106 displays the preliminary QR code 120. In certain embodiments, the processor 108 of the user device 106 instructs a display 112 of the user device 106 to display the preliminary QR code 120.

At operation 406, the processor 108 of the user device 106 analyzes the identification feature 122 to determine a name 124 of a corresponding service provider. In certain embodiments when a malicious user replaces or alters the preliminary QR code 120 on the user device 106 with a malicious QR code 142, the corresponding service provider may not match the desired service provider 146. In other words, the name 124 may not match a name 126 of the desired service provider 146.

At operation 408, the processor 108 of the user device 106 determines if the name 124 of the corresponding service provider matches the name 126 of the desired service provider 146. In certain embodiments, the processor 108 of the user device 106 may instruct the display 112 to display the name 124 of the corresponding service provider and may request the user 104 to confirm if the name 124 of the corresponding service provider matches the name 126 of the desired service provider 146. When the user 104 confirms that the name 124 of the corresponding service provider matches the name 126 of the desired service provider 146, the processor 108 of the user device 106 determines that the name 124 of the corresponding service provider matches the name 126 of the desired service provider 146. When the user 104 does not confirm that the name 124 of the corresponding service provider matches the name 126 of the desired service provider 146, the processor 108 of the user device 106 determines that the name 124 of the corresponding service provider does not match the name 126 of the desired service provider 146.

In response to determining at operation 408 that the name 124 of the corresponding service provider does not match the name 126 of the desired service provider 146, method 400 continues to operation 410. At operation 410, the processor 108 of the user device 106 generates an alert 140 indicating a potential security breach.

At operation 412, the user device 106 displays the alert 140. In certain embodiments, the processor 108 of the user device 106 instructs the display 112 of the user device 106 to display the alert 140. After performing operation 412, method 400 ends.

In response to determining at operation 408 that the name 124 of the corresponding service provider matches the name 126 of the desired service provider 146, method 400 continues to operation 414. At operation 414, the processor 108 of the user device 106 analyzes the identification feature 122 to determine the identification credential 128 of the desired service provider 146 and information 130 of the interaction provider 160. In certain embodiments, the information 130 may comprise a uniform resource locator (URL) or an internet protocol (IP) address for a server 162 of the interaction provider 160.

At operation 416, the processor 108 of the user device 106 sends the identification credential 128 of the desired service provider 146 to the server 162 of the interaction provider 160. In certain embodiments when a malicious user replaces or alters the preliminary QR code 120 on the user device 106 with a malicious QR code 142, the identified identification credential may not match the identification credential 128 of the desired service provider 146.

At operation 418, a processor 164 of the server 162 of the interaction provider 160 determines if the identification credential 128 matches a stored identification credential 172 that is stored in a memory 168 of the server 162.

In response to determining at operation 418 that the identification credential 128 does not match the stored identification credential 172, method 400 continues to operation 420. At operation 420, the processor 164 of the server 162 of the interaction provider 160, sends a notification 180 to the user device 106. The notification 180 indicates that the identification credential 128 does not match the stored identification credential 172. After performing operation 420, method 400 continues to operation 410.

At operation 410, the processor 108 of the user device 106 generates an alert 140 indicating a potential security breach.

At operation 412, the user device 106 displays the alert 140. In certain embodiments, the processor 108 of the user device 106 instructs the display 112 of the user device 106 to display the alert 140. After performing operation 412, method 400 ends.

In response to determining at operation 418 that the identification credential 128 matches the stored identification credential 172, method 400 continues to operation 422. At operation 422, the processor 164 of the server 162 of the interaction provider 160, sends a notification 180 to the user device 106. The notification 180 indicates that the identification credential 128 matches the stored identification credential 172.

At operation 424, the processor 108 of the user device 106 requests a QR code 138 from the server 162 of the interaction provider 160 to perform an interaction. In certain embodiments, the processor 108 of the user device 106 sends a request 178 for the QR code 138 to the server 162 of the interaction provider 160.

At operation 426, the processor 164 of the server 162 of the interaction provider 160 generates a recursion number 174. The recursion number 174 indicates a number of recursions for generating the QR code 138.

At operation 428, the processor 164 of the server 162 of the interaction provider 160 generates a first directed acyclic graph (DAG) (e.g., respective one of DAGs 176 of FIG. 1).

At operation 430, the processor 108 of the user device 106 receives recursion number 174 from the server 162 of the interaction provider 160.

At operation 432, the processor 108 of the user device 106 receives the first DAG (e.g., respective one of DAGs 176 of FIG. 1) from the server 162 of the interaction provider 160.

At operation 434, the processor 108 of the user device 106 generates a first portion (e.g., respective one of QR code portions 132 of FIG. 1) of the QR code 138 based on the first DAG (e.g., respective one of DAGs 176 of FIG. 1).

At operation 436, the processor 108 of the user device 106 adds the first portion (e.g., respective one of QR code portions 132 of FIG. 1) of the QR code 138 to the preliminary QR code 120 to generate a first intermediate QR code (e.g., respective one of intermediate QR codes 134 of FIG. 1).

At operation 438, the user device 106 displays the first intermediate QR code (e.g., respective one of intermediate QR codes 134 of FIG. 1). In certain embodiments, the processor 108 of the user device 106 instructs the display 112 of the user device 106 to display the first intermediate QR code (e.g., respective one of intermediate QR codes 134 of FIG. 1).

At operation 440, the processor 108 of the user device 106 determines if all recursion operations are performed for generating the QR code 138.

In response to determining at operation 440 that all recursion operations are not performed, method 400 continues to operation 442.

At operation 442, the processor 108 of the user device 106 analyzes an identification feature (e.g., respective one of identification features 136 of FIG. 1) of a current intermediate QR code (e.g., respective one of intermediate QR codes 134 of FIG. 1) to determine a new identification credential 144. In certain embodiments when a malicious user replaces or alters the current intermediate QR code (e.g., respective one of intermediate QR codes 134 of FIG. 1) on the user device 106 with a malicious QR code 142, the new identification credential 144 may not match the identification credential 128 of the desired service provider 146.

At operation 444, the processor 108 of the user device 106 sends the new identification credential 144 to the server 162 of interaction provider 160.

At operation 446, the processor 108 of the user device 106 determines if the new identification credential 144 matches the stored identification credential 172.

In response to determining at operation 446 that the new identification credential 144 does not match the stored identification credential 172, method 400 continues to operation 448. At operation 448, the processor 164 of the server 162 of the interaction provider 160, sends a notification 180 to the user device 106. The notification 180 indicates that the new identification credential 144 does not match the stored identification credential 172. After performing operation 448, method 400 continues to operation 410. At operation 410, the processor 108 of the user device 106 generates an alert 140 indicating a potential security breach.

At operation 412, the user device 106 displays the alert 140. In certain embodiments, the processor 108 of the user device 106 instructs the display 112 of the user device 106 to display the alert 140. After performing operation 412, method 400 ends.

In response to determining at operation 446 that the new identification credential 144 matches the stored identification credential 172, method 400 continues to operation 450. At operation 450, the processor 164 of the server 162 of the interaction provider 160 generates a subsequent DAG (e.g., respective one of DAGs 176 of FIG. 1).

At operation 452, the processor 108 of the user device 106 receives the subsequent DAG (e.g., respective one of DAGs 176 of FIG. 1) from the server 162 of the interaction provider 160.

At operation 454, the processor 108 of the user device 106 generates a subsequent portion (e.g., respective one of QR code portions 132 of FIG. 1) of the QR code 138 based on the subsequent DAG (e.g., respective one of DAGs 176 of FIG. 1).

At operation 456, the processor 108 of the user device 106 adds the subsequent portion (e.g., respective one of QR code portions 132 of FIG. 1) of the QR code 138 to the current intermediate QR code (e.g., respective one of intermediate QR codes 134 of FIG. 1) to generate a subsequent intermediate QR code (e.g., respective one of intermediate QR codes 134 of FIG. 1).

At operation 458, the user device 106 displays the subsequent intermediate QR code (e.g., respective one of intermediate QR codes 134 of FIG. 1). In certain embodiments, the processor 108 of the user device 106 instructs the display 112 of the user device 106 to display the subsequent intermediate QR code (e.g., respective one of intermediate QR codes 134 of FIG. 1). After performing operation 458, method 400 continues to operation 440. In certain embodiments, operations 440-458 are repeated until all recursion operations are performed.

In response to determining at operation 440 that all recursion operations are performed, method 400 continues to operation 460. At operation 460, the user device 106 displays the QR code 138. In certain embodiments, the processor 108 of the user device 106 instructs the display 112 of the user device 106 to display the QR code 138.

At operation 462, the processor 108 of the user device 106 determines if the QR code 138 corresponds to the DAGs 176. In certain embodiments when a malicious user replaces or alters the QR code 138 on the user device 106 with a malicious QR code 142, the malicious QR code 142 may not correspond to the DAGs 176.

In response to determining at operation 462 that the QR code 138 does not correspond to the DAGs 176, method 400 continues to operation 410. At operation 410, the processor 108 of the user device 106 generates an alert 140 indicating a potential security breach.

At operation 412, the user device 106 displays the alert 140. In certain embodiments, the processor 108 of the user device 106 instructs the display 112 of the user device 106 to display the alert 140. After performing operation 412, method 400 ends.

In response to determining at operation 462 that the QR code 138 corresponds to the DAGs 176, method 400 continues to operation 464. At operation 464, the processor 108 of the user device 106 performs the interaction based on the QR code 138.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a server of an interaction provider, wherein the server comprises:
a first memory configured to store:
identification credentials for a plurality of service providers; and
a first processor communicatively coupled to the first memory, wherein the first processor is configured to:
generate one or more directed acyclic graphs (DAGs), wherein the one or more DAGs comprise information to generate a quick response (QR) code; and
a user device communicatively coupled to the server, wherein the user device comprises:
a second processor configured to:
capture a preliminary quick response (QR) code displayed by a device of a desired service provider, wherein the preliminary QR code has a substantially blank region and comprises an identification feature of the desired service provider, the identification feature configured to identify the desired service provider to the interaction provider;
display the preliminary QR code;
analyze the identification feature to determine a name of a corresponding service provider;
in response to determining that the name of the corresponding service provider matches a name of the desired service provider, analyze the identification feature to determine an identification credential of the desired service provider and information of the interaction provider; and
in response to determining that the identification credential matches a stored identification credential stored in the server of the interaction provider:
request a QR code from the server of the interaction provider to perform an interaction requested by the desired service provider;
receive a first DAG from the server of the interaction provider;
generate a first portion of the QR code based on the first DAG;
add the first portion of the QR code to the preliminary QR code to generate a first intermediate QR code;
display the first intermediate QR code; and
perform one or more recursion operations until the QR code is generated from the preliminary QR code, wherein performing each recursion operation comprises:
analyzing an identification feature of a current intermediate QR code to determine a new identification credential; and
in response to determining that the new identification credential matches the stored identification credential:
receiving a subsequent DAG from the server of the interaction provider;
generating a subsequent portion of the QR code based on the subsequent DAG;
adding the subsequent portion of the QR code to the current intermediate QR code to generate a subsequent intermediate QR code; and
displaying the subsequent intermediate QR code.

2. The system of claim 1, wherein the second processor is further configured to:
in response to determining that the name of the corresponding service provider does not match the name of the desired service provider:
generate an alert indicating a potential security breach; and
display the alert.

3. The system of claim 1, wherein the second processor is further configured to:
in response to determining that the identification credential does not match the stored identification credential:
generate an alert indicating a potential security breach; and
display the alert.

4. The system of claim 1, wherein the second processor is further configured to:
in response to determining that the new identification credential does not match the stored identification credential:
generate an alert indicating a potential security breach; and
display the alert.

5. The system of claim 1, wherein the second processor is further configured to:
in response to determining that all DAGs are received from the server of the interaction provider:
display the QR code; and
in response to determining that the QR code corresponds to the DAGs received from the server of the interaction provider, perform the interaction based on the QR code.

6. The system of claim 5, wherein the second processor is further configured to:
in response to determining that the QR code does not correspond to the DAGs received from the server of the interaction provider:

generate an alert indicating a potential security breach; and display the alert.

7. The system of claim 1, wherein the first DAG is different from the subsequent DAG.

8. A method comprising:

capturing a preliminary quick response (QR) code displayed by a device of a desired service provider, wherein the preliminary QR code has a substantially blank region and comprises an identification feature of the desired service provider, the identification feature configured to identify the desired service provider to an interaction provider;

displaying the preliminary QR code;

analyzing the identification feature to determine a name of a corresponding service provider;

in response to determining that the name of the corresponding service provider matches a name of the desired service provider, analyzing the identification feature to determine an identification credential of the desired service provider and information of the interaction provider; and in response to determining that the identification credential matches a stored identification credential stored in a server of the interaction provider:

requesting a QR code from the server of the interaction provider to perform an interaction requested by the desired service provider;

generating one or more directed acyclic graphs (DAGs), wherein the one or more DAGs comprise information to generate the QR code;

receiving a first DAG from the server of the interaction provider;

generating a first portion of the QR code based on the first DAG;

adding the first portion of the QR code to the preliminary QR code to generate a first intermediate QR code;

displaying the first intermediate QR code; and performing one or more recursion operations until the QR code is generated from the preliminary QR code, wherein performing each recursion operation comprises:

analyzing an identification feature of a current intermediate QR code to determine a new identification credential; and in response to determining that the new identification credential matches the stored identification credential:

receiving a subsequent DAG from the server of the interaction provider;

generating a subsequent portion of the QR code based on the subsequent DAG;

adding the subsequent portion of the QR code to the current intermediate QR code to generate a subsequent intermediate QR code; and displaying the subsequent intermediate QR code.

9. The method of claim 8, further comprising:

in response to determining that the name of the corresponding service provider does not match the name of the desired service provider:

generating an alert indicating a potential security breach; and displaying the alert.

10. The method of claim 8, further comprising:

in response to determining that the identification credential does not match the stored identification credential:

generating an alert indicating a potential security breach; and displaying the alert.

11. The method of claim 8, further comprising:

in response to determining that the new identification credential does not match the stored identification credential:

generating an alert indicating a potential security breach; and displaying the alert.

12. The method of claim 8, further comprising:

in response to determining that all DAGs are received from the server of the interaction provider:

displaying the QR code; and in response to determining that the QR code corresponds to the DAGs received from the server of the interaction provider, performing the interaction based on the QR code.

13. The method of claim 12, further comprising:

in response to determining that the QR code does not correspond to the DAGs received from the server of the interaction provider:

generating an alert indicating a potential security breach; and displaying the alert.

14. The method of claim 8, wherein the first DAG is different from the subsequent DAG.

15. A non-transitory computer-readable medium storing instructions that, when executed by one or more processors, cause the one or more processors to:

capture a preliminary quick response (QR) code displayed by a device of a desired service provider, wherein the preliminary QR code has a substantially blank region and comprises an identification feature of the desired service provider, the identification feature configured to identify the desired service provider to an interaction provider;

display the preliminary QR code;

analyze the identification feature to determine a name of a corresponding service provider;

in response to determining that the name of the corresponding service provider matches a name of the desired service provider, analyze the identification feature to determine an identification credential of the desired service provider and information of the interaction provider; and in response to determining that the identification credential matches a stored identification credential stored in a server of the interaction provider:

request a QR code from the server of the interaction provider to perform an interaction requested by the desired service provider;

generate one or more directed acyclic graphs (DAGs), wherein the one or more DAGs comprise information to generate the QR code;

receive a first DAG from the server of the interaction provider;

generate a first portion of the QR code based on the first DAG;

add the first portion of the QR code to the preliminary QR code to generate a first intermediate QR code;

display the first intermediate QR code; and perform one or more recursion operations until the QR code is generated from the preliminary QR code, wherein performing each recursion operation comprises:

analyzing an identification feature of a current intermediate QR code to determine a new identification credential; and in response to determining that the new identification credential matches the stored identification credential:

receiving a subsequent DAG from the server of the interaction provider;

generating a subsequent portion of the QR code based on the subsequent DAG;

adding the subsequent portion of the QR code to the current intermediate QR code to generate a subsequent intermediate QR code; and displaying the subsequent intermediate QR code.

16. The non-transitory computer-readable medium of claim 15, wherein the instructions, when executed by the one or more processors, further cause the one or more processors to:

in response to determining that the name of the corresponding service provider does not match the name of the desired service provider:

generate an alert indicating a potential security breach; and display the alert.

17. The non-transitory computer-readable medium of claim 15, wherein the instructions, when executed by the one or more processors, further cause the one or more processors to:

in response to determining that the identification credential does not match the stored identification credential:

generate an alert indicating a potential security breach; and display the alert.

18. The non-transitory computer-readable medium of claim 15, wherein the instructions, when executed by the one or more processors, further cause the one or more processors to:

in response to determining that the new identification credential does not match the stored identification credential:

generate an alert indicating a potential security breach; and display the alert.

19. The non-transitory computer-readable medium of claim 15, wherein the instructions, when executed by the one or more processors, further cause the one or more processors to:

in response to determining that all DAGs are received from the server of the interaction provider:

display the QR code; and in response to determining that the QR code corresponds to the DAGs received from the server of the interaction provider, perform the interaction based on the QR code.

20. The non-transitory computer-readable medium of claim 19, wherein the instructions, when executed by the one or more processors, further cause the one or more processors to:

in response to determining that the QR code does not correspond to the DAGs received from the server of the interaction provider:

generate an alert indicating a potential security breach; and display the alert.

* * * * *